United States Patent [19]

Morikawa et al.

[11] 4,333,325
[45] Jun. 8, 1982

[54] STEERING SHAFT LOCKING DEVICE

[75] Inventors: Minoru Morikawa, Nagoya; Sadao Kokubu, Iwakura; Tadashi Hirai, Nagoya, all of Japan

[73] Assignee: Kabushiki Kaisha Tokai Rika Denki Seisakusho, Aichi, Japan

[21] Appl. No.: 32,105

[22] Filed: Apr. 20, 1979

[30] Foreign Application Priority Data

Apr. 24, 1978 [JP] Japan .............................. 53/55510[U]

[51] Int. Cl.³ ...................... B60R 25/02; E05B 65/12
[52] U.S. Cl. .......................................... 70/186; 70/252
[58] Field of Search ................................ 70/186, 252

[56] References Cited

U.S. PATENT DOCUMENTS 2,063,088 12/1936 Fitzgerald ............................ 70/252

FOREIGN PATENT DOCUMENTS

| | | | |
|---|---|---|---|
| 1166642 | 3/1964 | Fed. Rep. of Germany | 70/186 |
| 1960634 | 6/1971 | Fed. Rep. of Germany | 70/252 |
| 1963961 | 6/1971 | Fed. Rep. of Germany | 70/252 |
| 2058747 | 5/1972 | Fed. Rep. of Germany | 70/252 |
| 2018882 | 10/1979 | United Kingdom | 70/252 |

*Primary Examiner*—Roy D. Frazier
*Assistant Examiner*—Carl F. Pietruszka
*Attorney, Agent, or Firm*—Wenderoth, Lind & Ponack

[57] ABSTRACT

A steering shaft locking device has a locking rotor rotatably mounted in a housing which is key actuated. A movable piece is moved radially outwardly of the rotor when a key is inserted therein, but is free to move inwardly when no key is present. A cam on the end of the rotor moves a lock bar transversely of the rotor against the action of a first spring. A projection on the edge of the lock bar engages one end of a lock shaft for moving it in one rotational direction from a neutral position, at which it is held by a second spring which is weaker than the first spring, and the other end of the lock shaft has a shape such that when it is moved in the one rotational direction, it moves away from the movable piece, and when it is moved in the other direction by the movement of the lock shaft by the first spring, it moves the movable piece, and thus permits the lock bar to move past the one end of the lock shaft.

4 Claims, 20 Drawing Figures

STEERING SHAFT LOCKING DEVICE

The present invention relates to a steering shaft locking device for use in a motor vehicle and, more particularly, to a device for locking a steering shaft to prevent the vehicle from being stolen.

Conventionally, various locking devices for locking steering shafts of motor vehicles have been proposed and put into practical use mainly for the purpose of theft prevention for motor vehicles. In such locking devices, there is provided a rotor engaged in a rotor case which is accommodated in a housing associated with a cam shaft for closing and opening an ignition switch, said cam shaft having a cam associated with a locking bar which is urged in the locking direction of a steering shaft. By the above arrangement, the ignition switch is set to an OFF position by a key inserted into the rotor for rotation thereof so that the ignition switch is made operative, and the locking bar is displaced to an unlocking position by the cam shaft, and then the ignition switch is restored to the OFF position whereupon the key is withdrawn from the rotor, and the locking bar is displaced to the locking position by the urging force acting thereon. However, since such conventional steering shaft locking devices are composed of a number of parts, they have a complicated construction and are difficult to assemble.

Accordingly, an essential object of the present invention is to provide a steering shaft locking device which can eliminate the disadvantages inherent in the conventional devices, and which is stable during functioning, has a simple construction and is easy to assemble.

According to the present invention, there is provided a steering shaft locking device for vehicle, wherein a locking bar is displaced into a non-locking position by a cam when a key has been engaged in a rotor and has been turned for urging the locking bar in the locking direction of the steering shaft. The locking bar is connected with a cam which operatively cooperates with the rotor engaged with the rotor case inside the housing, and the locking bar is adapted to be displaced into the locking position by the urging force of a spring when the key has been pulled out of the rotor. The device has a piece which is engaged for displacement in the diametral direction by insertion of the key into the key hole of said rotor and is adapted to be displaced so that the end face will coincide with the outer peripheral face of the rotor; a locking shaft is provided which is rotatably supported on said rotor case, which has a contact portion at one end, the contact portion being brought into contact against the end face of said piece and brought to a stop, and which is prevented from being rotated in one direction, and which has an engaging portion at its other end, the engaging portion being able to engage said locking bar in the non-locking position; and a rotary neutral spring is provided which has an elastic force weaker than the urging force on said locking bar, and retains said locking shaft in the neutral position where said engaging portion engages the locking bar with said contact portion being brought into contact against said piece and brought to a stop. With the above construction of the device, the piece is adapted to regulate the rotation of the locking shaft when the key is inserted into the rotor and the rotor is rotated in the ON direction of rotation of the ignition switch. When the key has been restored again to the OFF position after movement of the locking bar to the non-locking position by the cam, the locking bar is engaged and retained in the non-locking position. As means for engaging and retaining the locking bar and for releasing the engagement of the locking bar when pulling out the key, the locking shaft is retained in the neutral position by the rotary neutral spring.

The piece may be a slide type or a rotating rotary type, and the rotary neutral spring may be a coil or plate spring.

These and other object and features of the present invention will be more readily apparent from the following description of a preferred embodiment thereof with reference to the accompanying drawings, in which.

Before the description of the present invention proceeds, it is to be noted that like parts are designated by like reference numerals and symbols throughout the several views of the accompanying drawings.

Figure 1:
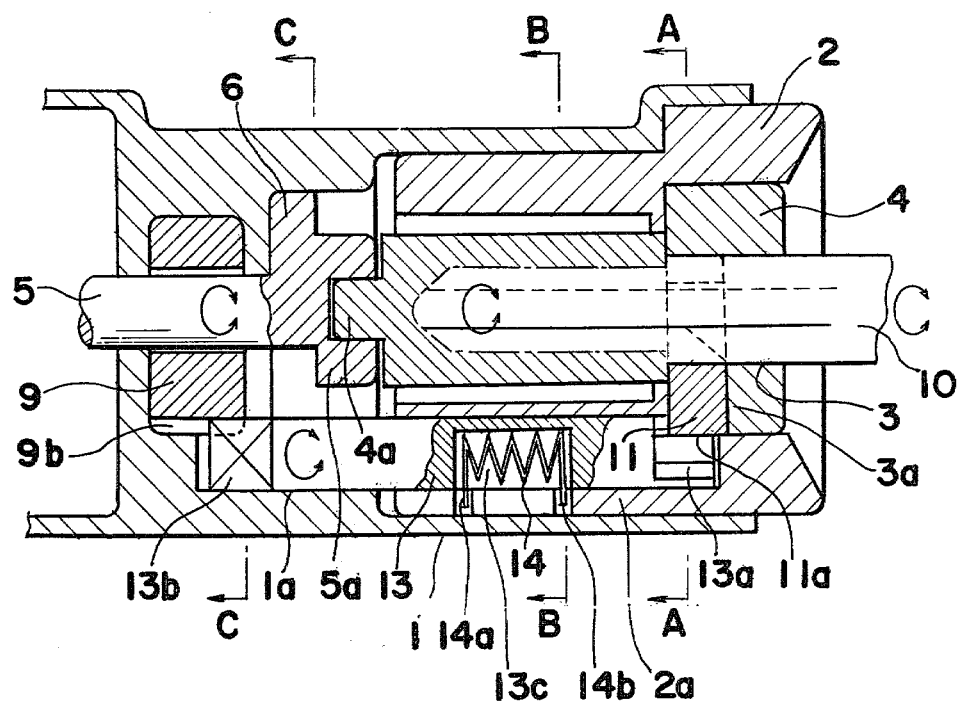
FIG. 1 is a longitudinal-section view of a steering shaft locking device provided on the steering shaft of a vehicle in accordance with the present invention.

Referring now to the drawings, there is shown in FIG. 1 a steering shaft locking device including a housing 1 having a cylindrical shape mounted on a steering shaft 7 of vehicle in a conventional manner as shown in FIGS. 5a–5f. Within the housing, there is a rotor case 2 extending thereinto from the opening at one end of the housing 1 and fixed therein, and in which is rotatably mounted a rotor 4 having a key hole 3 and a plurality of tumblers 14 and having a large diameter for receiving a key 10 therein. The rotor 4 is retained in case 2 by a holding means such as a stop (not shown) in a known manner.

Within the housing at the inner end of the rotor case 2 there is provided a cam shaft 5 having a cam 6 thereon to which the rotor 4 is connected by coupling portions 4a and 5a so that the cam shaft 5 rotates together with the rotor 4 as one unit upon rotation of the rotor 4, whereby an ignition switch (not shown) of known construction can be actuated in a known manner.

Figure 5A:
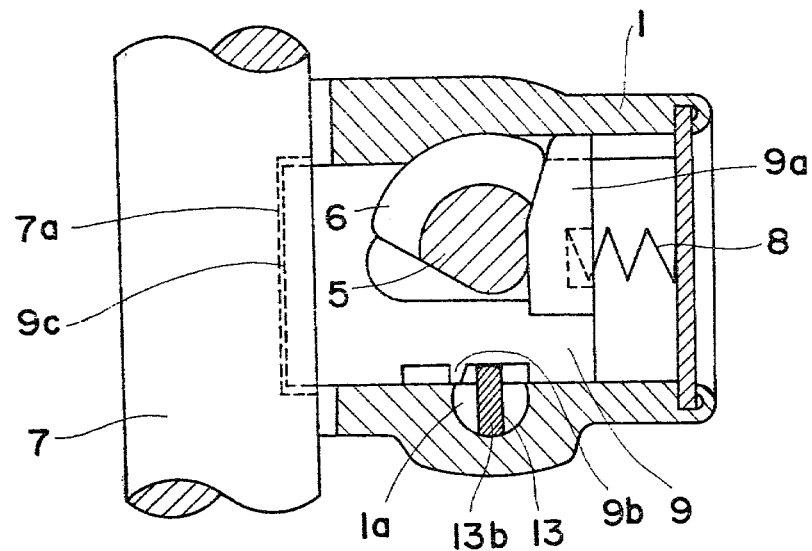
FIGS. 5a–5f are cross-sectional views taken along line C—C of FIG. 1 and showing the parts in positions corresponding to FIGS. 2a–2f respectively.
Figure 5B:
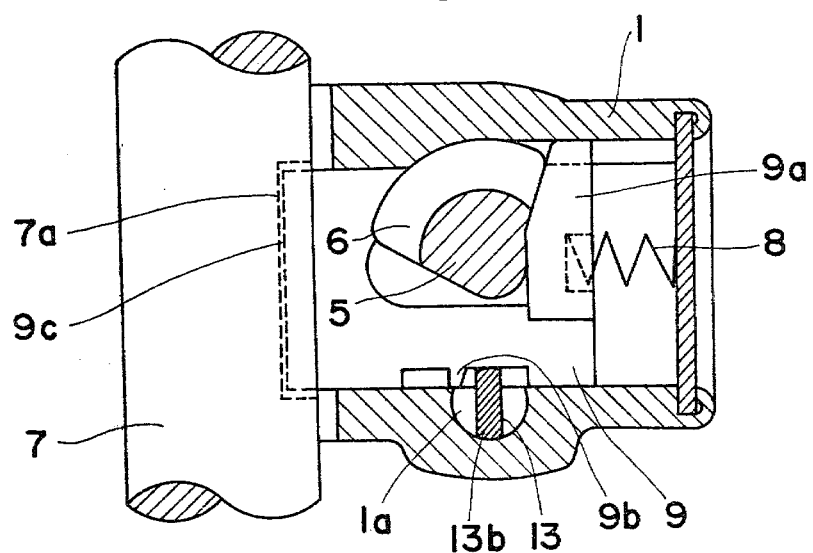
Figure 5C:
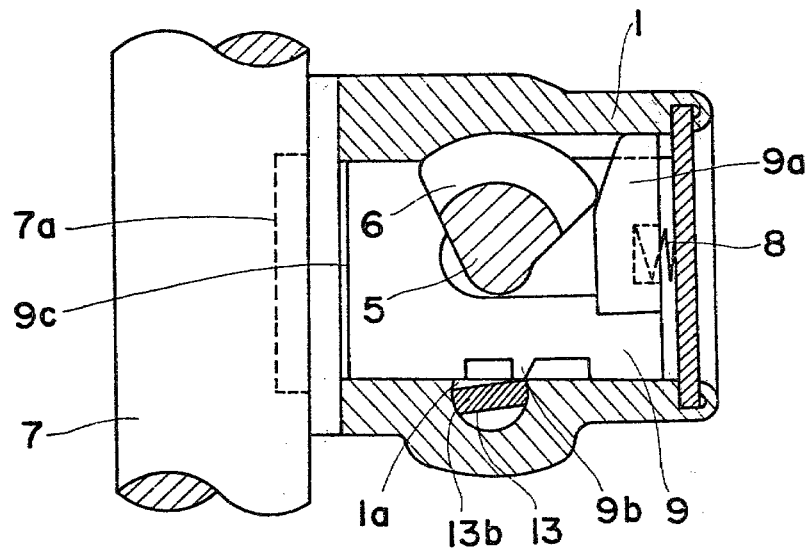

In the inner end of the housing 1, there is provided straddling the cam shaft 5 a lock bar 9 which is slidably mounted in the housing 1 and is urged by a coil spring 8, provided between the housing 1 and the lock bar 9, in the locking direction toward the steering shaft 7 from the free, unlocked position, e.g. as in FIG. 5c, to the locking position for engaging the external portion 9c thereof with a recess 7a in the steering shaft 7 to lock the steering shaft 7 against movement, as shown, e.g. in FIG. 5a. The bar 9 has a follower portion 9a which is slidably engaged by the cam 6 on the cam shaft 5.

By the above arrangement, when the key 10 is inserted into the key hole 3 of the rotor 4 and rotated clockwise thereof from the OFF position to the ON position, the ignition switch is switched to the conductive condition and the lock bar 9 is moved by the cam 6 against the action of the coil spring 8 to the unlocked position and is stopped and held at the unlocked position by a stop means 13 in a manner which will be described later, even when the rotor 4 and the key 10 are rotated counterclockwise to return the rotor to the OFF position. When the key is withdrawn from the key hole 3 of the rotor 4, the lock bar 9 is disengaged from the stop means and is caused to slide to the locking position by the urging force of the coil spring 8.

Referring now to FIG. 2, within the rotor 4 there is provided a radial groove 3a extending through the key hole 3 and in which a piece 11 is slidably mounted. The slide piece has an outer end surface 11a having an arched-shape with the same curvature as the outer peripheral surface of the rotor 4 and an inner end 11b which is provided with a notch having the same shape as that of the groove of the key hole 3 which matches the cross-sectional shape of the key 10, so that, when the key 10 is inserted into the key hole 3, the outer end surface 11a of the slide piece 11 is forcibly caused to slide radially outward until it is aligned with the outer peripheral surface of the rotor 4 by the engagement of the shoulder 10a of the key 10 with the inner end 11b of the piece 11. On the other hand the slide piece 11 is freely slidable inward when the key 10 is withdrawn from the key hole 3.

Those skilled in the art will appreciate that the piece 11 can be modified, for example to a piece rotatably mounted for rotation around an axis so that the free end will have the same function as that of the slidable piece 11 described above, i.e., when the key 10 is inserted into the key hole 3, the free end of the rotary piece is forcibly moved outward to be aligned with the outer peripheral surface of the rotor 4 by the engagement of the inner end 11b, with the shoulder 10a of the key 10, and the rotary piece is freely rotated to move the inner end inward when the key 10 is withdrawn from the key hole 3. Also, the engagement of the piece 11 and the key 10 inserted into the key hole 3 may be by means of other fitting portions provided between them instead of the inner end 11b and the shoulder 10a thereof.

Referring to FIG. 1, in the inside of the housing 1 are two engaging grooves 1a and 2a extending parallel of the axis of the rotor, one through the wall of the rotor case 2 and the other in the inner wall of the housing 1, and a lock shaft 13 having a round cross-section rotatably extends through these grooves.

Figure 3:
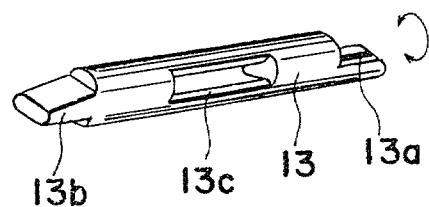
FIG. 3 is a perspective view of a locking shaft employed in the device of FIG. 1.

As shown in FIG. 3, the lock shaft 13 has at one end a first stop 13a with a semicircular recessed shape as shown in the parts of FIG. 2, and this positioned in the part of groove 2a opposite the outer end of piece 11, so that the rotation of the lock shaft 13 is restricted within a certain angular range by the engagement of the first stop 13a with the outer end surface 11a of the slide piece 11 when it has been moved outwardly by the insertion of the key 10. However, the lock shaft 13 can freely rotate when the outer end surface 11a of the slide piece is caused to slide inwardly when the key 10 is withdrawn. The lock shaft 13 is normally held at a neutral rotational position so as to be engaged with the slide piece 11 as shown in FIG. 2a by means of a coil spring 14. The other end of the lock shaft 13 is provided with a second stop 13b which is engaged by a projection 9b on the lock bar 9 to stop the lock bar 9 at the unlocked position. The lock bar 9 is moved by the force of the spring 8 towards the locked position when the second stop 13b is disengaged from the projection 9b, and the lock shaft 13 is normally held by the spring 14 at the neutral position so that the second stop 13b can be engaged by the projection 9b as shown in FIG. 5a.

Figure 4A:
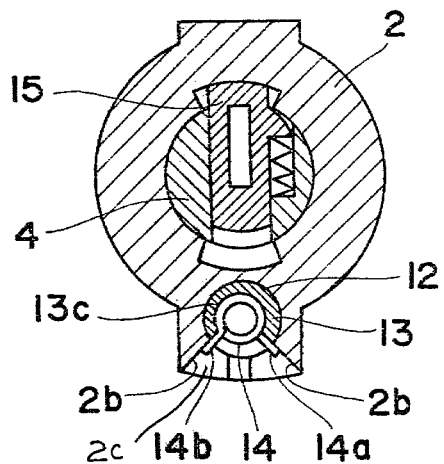
FIGS. 4a–4f are cross-sectional views taken along line B—B of FIG. 1 showing the parts in positions corresponding to FIGS. 2a–2f, respectively.
Figure 5D:
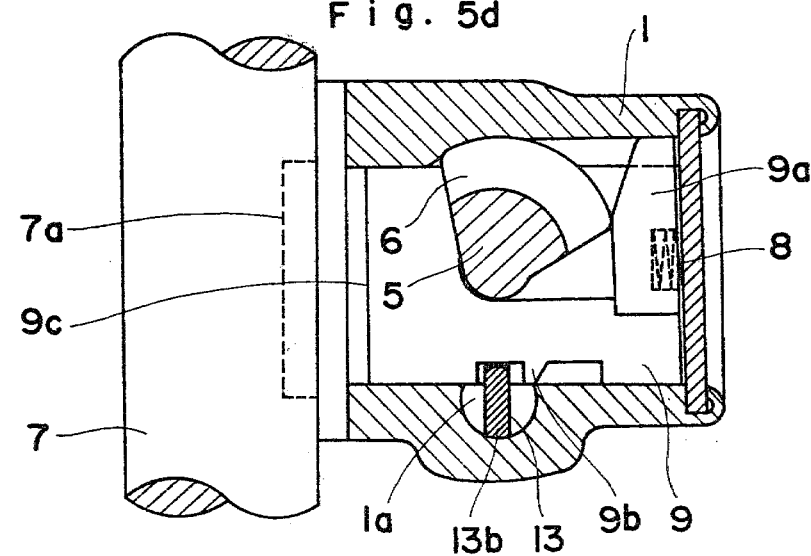
Figure 5E:
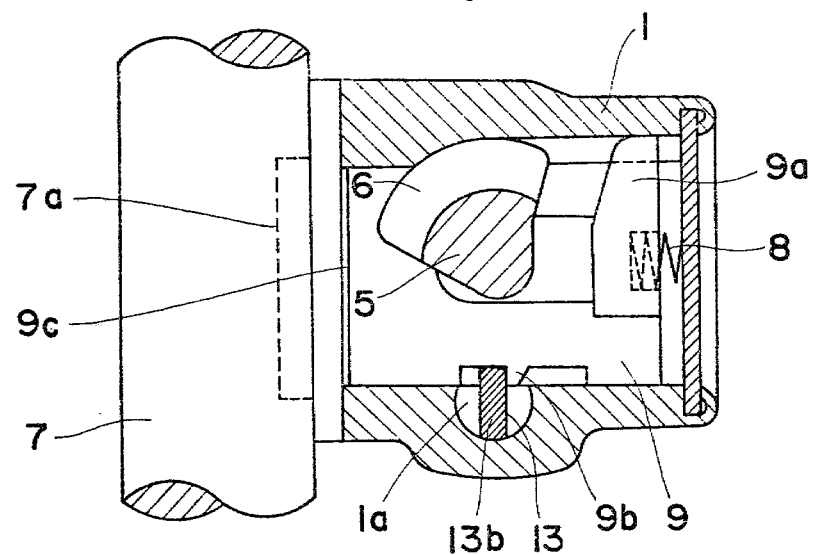

At the central portion of the lock shaft 3 there is provided a recess 13c extending along the shaft and wherein the coil spring 14 is positioned. Both ends 14a and 14b extend through an opening and engage the corresponding side wall surfaces 2b of an opening 2c of the groove 2a in the rotor case 2, respectively, as shown in FIG. 4a. In other words, the coil spring 14 is accommodated within the recess 13c in the lock shaft 13 and is rotatable together with the lock shaft 13 and provides a resilient force for urging the both ends 14a and 14b in the opposite directions, i.e. clockwise and counterclockwise, to contact the corresponding side wall surfaces 2b of the rotor case 2, respectively, so that the lock shaft 13 is normally brought to a stop and stably held in a neutral position by the force of the spring 14, whereat the first stop 13a is held in a position in which it contacts the outer end surface 11a of the slide piece 11 as shown in FIG. 2b and the second stop 13b is capable of stopping the lock bar 9 as shown in FIG. 5e.

It should be noted here that the coil spring 14 for holding the shaft 13 in the neutral position has a resilient force smaller than the force of the spring 8 for urging the lock bar 9 forward, so that when the lock shaft 13 is free to rotate, i.e. when the key 10 is withdrawn and piece 11 can freely move radially inwardly, the lock bar 9 moves forward due to the force of the spring 8 and the projection 9b is disengaged from the second stop 13b by turning the shaft 13 against the force of the spring 14. The spring 14 can be a plate type or a wire type spring having the same function as that of the coil type referred above.

Figure 2A:
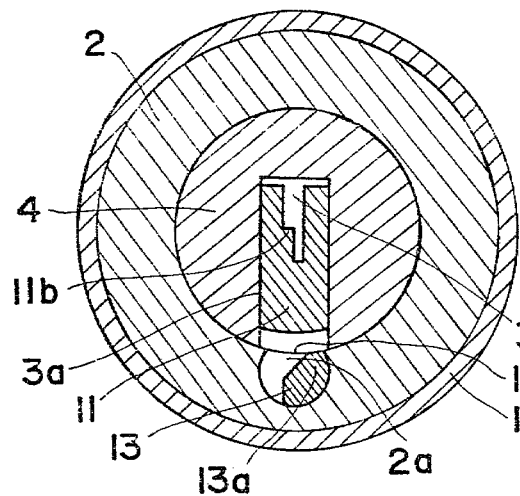
FIGS. 2a–2f are cross-sectional views taken along line A—A of FIG. 1 with the rotor in various different rotational positions.

In the operation of the steering the shaft locking device constructed as described above, in the absence of the key 10 as shown in FIGS. 2a and 4a, the lock bar 9 is caused to slide to the locking position by the coil spring 8 to lock the steering shaft 7, as shown in FIG. 5a, even if the slide piece 11 is freely located at any position and the first stop 13a on the lock shaft 13 is located in the neutral position by the urging force of the rotary spring 14, as shown in FIG. 4a. Accordingly, the steering wheel on the shaft 7 cannot be turned, whereby theft of the motor vehicle is prevented.

Figure 2B:
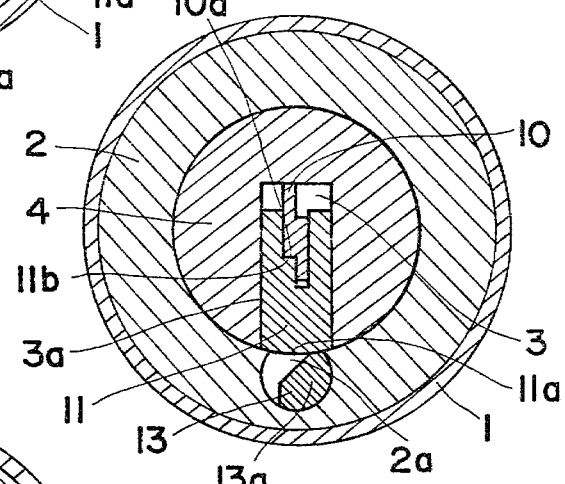
Figure 4B:
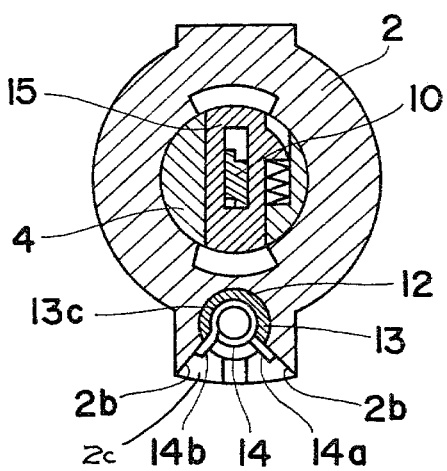

When the key 10 is inserted into the key hole 3 of the rotor 4 and found to be suitable for the steering lock by registering with a plurality of tumblers 15 of the conventional type in a known manner, as shown in FIG. 4b, the outer end surface 11a of the slide piece 11 is caused to slide outwardly so as to be aligned with the outer peripheral surface of the rotor 4 and to contact the first stop 13a on the lock shaft 13 located in the neutral position, as shown in FIG. 2b. The lock bar 9 remains in place as shown in FIG. 5b.

Figure 2C:
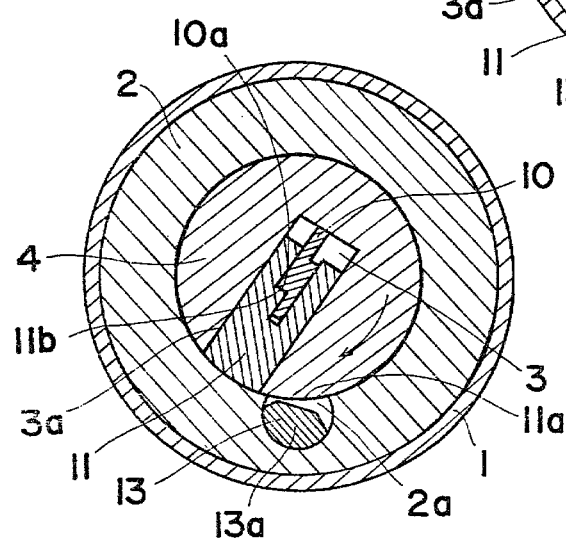
Figure 2D:
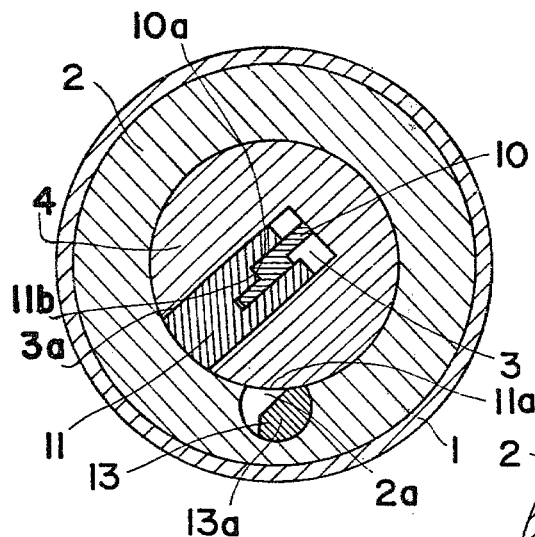
Figure 4C:
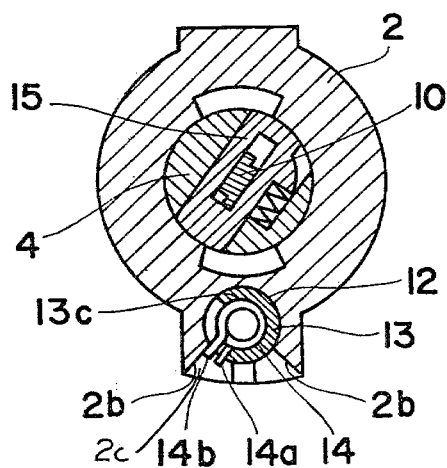
Figure 4D:
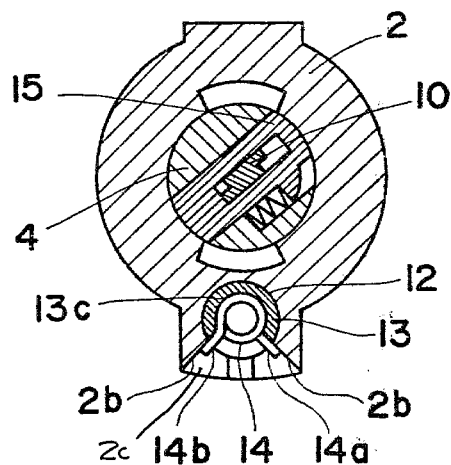
Figure 4E:
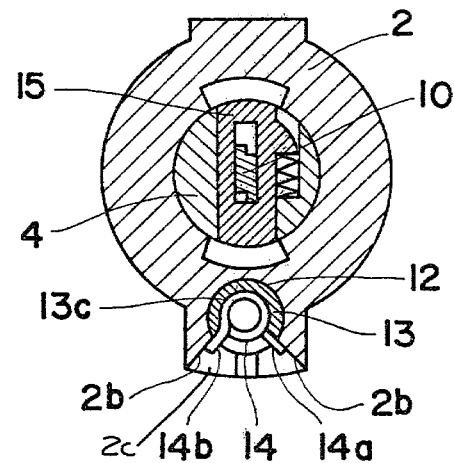

Subsequently, when the key 10 which has been inserted into the key hole 3 is rotated towards the ON position to rotate the rotor 4 together with the cam shaft clockwise, as shown in FIG. 2c, the lock bar 9 is caused to slide towards the unlocked position against the force of the coil spring 8 by the engagement of the follower portion 9a by the cam 6 on the cam shaft 5 which is driven by the rotor 4. When the lock bar 9 is urged toward the unlocked position, the projection 9b engages the second stop 13b of the lock shaft 13 and passes over it while rotating the lock shaft 13 clockwise, as shown in FIG. 5c, against the force of the neutral rotary spring 14 which is coiled as shown in FIG. 4c. After the projection 9b reaches a position past the second stop 13b as shown in FIG. 5d, the shaft 13 is returned to the neutral position as shown in FIGS. 4d and 5d, and projection 9b of the lock bar 9 is prevented from moving toward the lock position.

Figure 2E:
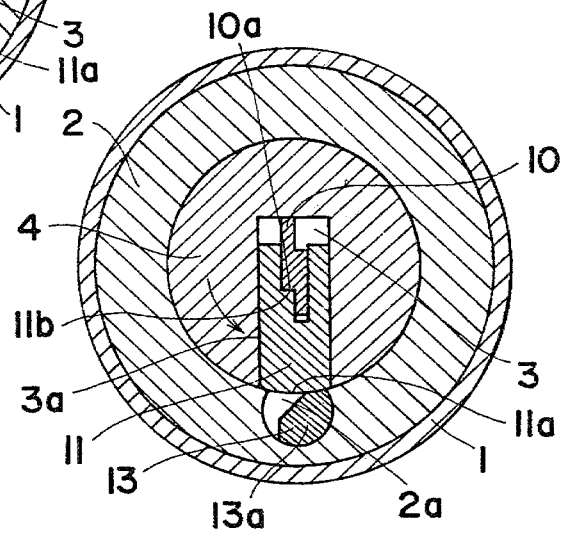

When the rotor 4 is rotated counterclockwise to the OFF position by the key 10 the lock bar 9 is no longer held at the unlocked position by the cam 7, as shown in FIG. 5e, and the force of spring 8 tending to return the lock bar 9 in the locking direction is transmitted through the second stop 9b to the stop 13b tending to rotate the lock shaft 13 counterclockwise. However, since the first stop 13a of the lock shaft 13 contacts the outer end surface 11a of the slide piece 11, as shown in FIG. 2e, which is aligned with the outer peripheral surface of the rotor 4 as long as the key 10 remains in the lock, the lock shaft 13 is prevented from being rotated counterclockwise, whereby the lock bar 9 is positively retained at the unlocked position.

Figure 2F:
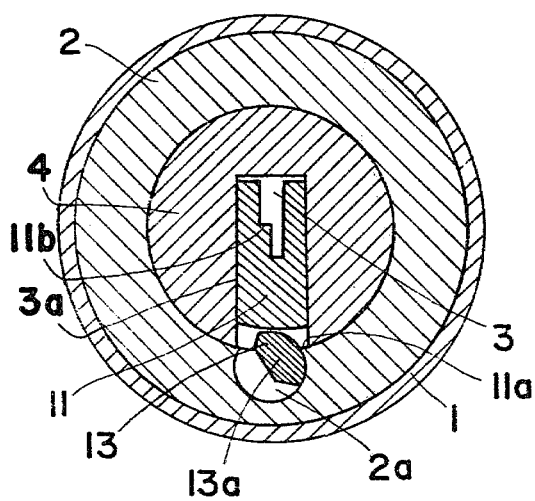
Figure 5F:
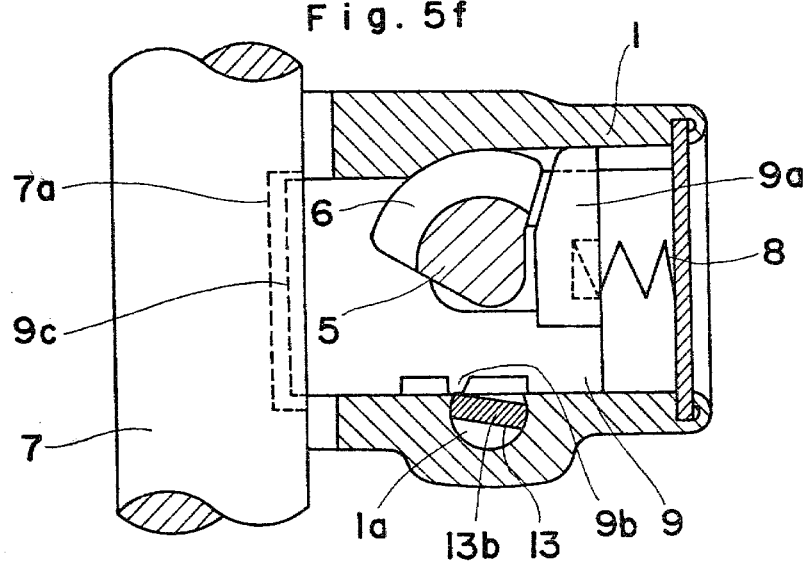

When the key 10 is withdrawn from the key hole 3, the slide piece 11 is free to slide inwardly, as shown in FIG. 2a. Thus, the first stop 13a on the lock shaft 13 urges the lower end surface 11a of the slide piece 11 inwardly, as shown in FIG. 2f, because the lock shaft 13 is rotated counterclockwise against the force of the spring 14 by the force of spring 8 urging the lock bar 9 towards the locked position. This force is transmitted to shaft 13 through the projection 9a and to the second stop 13b. When the slide piece 11 slides inwardly due to the force exerted thereon by the first stop 13a, the shaft 13 rotates, and the lock bar 9 is free to slide to the locked position as shown in FIG. 5f.

Figure 4F:
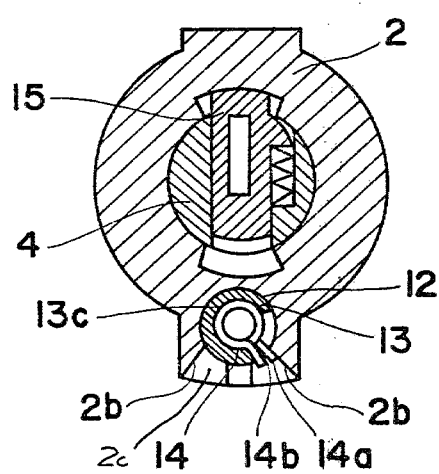

At this point spring 14 is compressed, as shown in FIG. 4f, so that when the projection 9b of the lock bar 9 is disengaged from the second stop 13b on the lock shaft 13, the lock shaft 13 is returned to the neutral position, as shown in FIG. 4a, by spring 14.

As is clear from the foregoing description, in the steering shaft locking device of the present invention, the key is inserted into the rotor for rotation thereof towards the ON position of the ignition switch, this rotation moves the locking bar towards the unlocked position, and then when the rotor is returned to the OFF position of the ignition switch by the rotation of the key, the locking bar is held at the unlocked position until the key is removed.

Furthermore, in the steering shaft locking device of the invention there are provided a locking shaft which is retained at the neutral position by a rotary spring and a slide piece for controlling the rotation of said locking shaft and which acts as means for releasing the locking bar when the key is withdrawn from the rotor. Accordingly, since the steering shaft locking device is fundamentally constructed of a slide piece, rotary spring and a locking shaft, it has a simple construction and can be constructed without difficulty. In addition thereto, since the locking bar is retained and released upon rotation of the locking shaft, there is no force urging the slide piece so as to interfere with insertion of the key thereinto, and insertion of the key can be smoothly carried out.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A steering shaft locking device, comprising:

a housing;

a locking rotor rotatably mounted in said housing and having key actuated means for locking said rotor against rotation in said housing and a slot for receiving a key for actuating said key actuated means;

a movable piece mounted in said locking rotor for movement of an outer end thereof to the periphery of the rotor when a key is inserted into said slot and being free to allow the outer end to move inwardly from the periphery of the rotor when no key is present in the slot;

a cam connected to the end of said rotor within said housing;

a lock bar slidably mounted in said casing for sliding movement transversely of the axis of rotation of said rotor and engaged by said cam for movement in response to movement of said rotor and having a projection on an edge thereof;

a first spring engaging said lock bar for urging said lock bar against said cam;

a lock shaft mounted in said housing for rotation around the longitudinal axis thereof and being held in said housing against movement in the axial direction thereof, said lock shaft having one end adjacent said projection on said lock bar and engaged by said projection for being rotated by said lock bar from a neutral rotational position in one rotational direction when said lock bar is moved in the one direction by said cam, and being rotated by said lock bar from said neutral rotational position in the other direction when said lock bar is moved in the other direction by said first spring, and having the other end adjacent the outer end of said movable piece, said other end having a shape for engaging said movable piece and urging it inwardly of said rotor when said lock shaft is rotated in said other rotational direction and moving out of contact with the periphery of said rotor when said lock shaft is rotated in said one direction; and a second spring engaging said lock shaft for urging said lock shaft to said neutral rotational position from a rotational position in either rotational direction from said neutral rotational position, said second spring being weaker than said first spring.

2. A steering shaft locking device as claimed in claim 1 in which said rotor has a radial opening between said slot and the outer periphery thereof, and said movable piece is a piece slidably mounted in said radial opening.

3. A steering shaft locking device as claimed in claim 1 in which said lock shaft has a recess therein in which said second spring is mounted.

4. A steering shaft locking device as claimed in claim 1 in which said second spring is a coil spring having the coils engaged with said lock shaft and having the free ends engaged with said housing.

* * * * *